United States Patent
Wu et al.

(10) Patent No.: US 9,674,005 B1
(45) Date of Patent: Jun. 6, 2017

(54) DEVICE AND METHOD FOR HANDLING CHANNEL ESTIMATION

(71) Applicant: MStar Semiconductor, Inc., Hsinchu Hsien (TW)

(72) Inventors: Cheng-Han Wu, Hsinchu Hsien (TW); Fong-Shih Wei, Hsinchu Hsien (TW); Chien-Chih Yu, Hsinchu Hsien (TW); Tai-Lai Tung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/084,159

(22) Filed: Mar. 29, 2016

(30) Foreign Application Priority Data

Jan. 15, 2016 (TW) .............................. 105101170 A (51) Int. Cl.
*H04L 1/02* (2006.01)
*H04L 25/02* (2006.01)
*H04B 1/06* (2006.01)

(52) U.S. Cl.
CPC ............ *H04L 25/025* (2013.01); *H04B 1/06* (2013.01)

(58) Field of Classification Search
CPC ................. H04L 25/025; H04B 1/06
See application file for complete search history.

(56) References Cited

U.S. PATENT DOCUMENTS

| | | | | |
|---|---|---|---|---|
| 2007/0127588 A1* | 6/2007 | Kim | ......................... | H04B 7/04 375/267 |
| 2010/0278288 A1* | 11/2010 | Panicker | ............... | H04L 5/0007 375/343 |
| 2010/0296553 A1* | 11/2010 | Luschi | ................... | H04B 1/707 375/148 |
| 2011/0151802 A1* | 6/2011 | Kwak | ................... | H04B 17/345 455/67.13 |
| 2012/0069937 A1* | 3/2012 | Stein | ..................... | H04L 25/024 375/340 |
| 2014/0099900 A1* | 4/2014 | Cili | ....................... | H04W 24/02 455/67.11 |

* cited by examiner

*Primary Examiner* — Dac Ha
(74) *Attorney, Agent, or Firm* — Edell, Shapiro & Finnan, LLC (57) ABSTRACT

A communication device includes: a detecting unit, performing a mobility detection in a time interval to generate a detection result; a selecting unit, selecting a channel estimation method from a plurality of channel estimation methods according to the detection result; and a channel estimating unit, coupled to the selecting unit, performing a channel estimation on a channel for receiving a signal according to the selected channel estimation method.

16 Claims, 8 Drawing Sheets

DEVICE AND METHOD FOR HANDLING CHANNEL ESTIMATION

This application claims the benefit of Taiwan application Serial No. 105101170, filed Jan. 15, 2016, the subject matter of which is incorporated herein by reference.

BACKGROUND OF THE INVENTION

Field of the Invention

The invention relates in general to a device and method for a communication system, and more particularly to a device and method for handling channel estimation.

Description of the Related Art

Before a communication system starts operating, i.e., before a transmitter starts transmitting signals to a receiver, the receiver usually performs channel estimation to estimate a channel between the transmitter and the receiver to further recover (e.g., equalize) the signals according to the result of the channel estimation. However, due to differences in environments of the transmitter and/or the receiver, variations in different levels in the channel between the two can be incurred. In general, one predetermined channel estimation method may not be applicable to all types of channels. Therefore, in order for the receiver to correctly perform channel estimation, how to select an appropriate channel estimation method for the channel estimation is a critical task.

SUMMARY OF THE INVENTION

The invention is directed to a device and method for handling channel estimation according to variation levels of a channel to solve the foregoing issue.

The present invention discloses a communication device. The communication device includes: a detecting unit, performing a mobility detection in a time interval to generate a detection result; a selecting unit, coupled to the detecting unit, selecting a channel estimation method from a plurality of channel estimation methods according to the detection result; and a channel estimating unit, coupled to the selecting unit, performing a channel estimation on a channel for receiving a signal according to the selected channel estimation method.

The present invention further discloses a method for handling channel estimation. The method includes performing a mobility detection in a time interval to generate a detection result by a detecting unit, selecting a channel estimation method from a plurality of channel estimation methods according to the detecting unit by a selecting unit, and performing a channel estimation on a channel for receiving a signal according to the selected channel estimation method.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
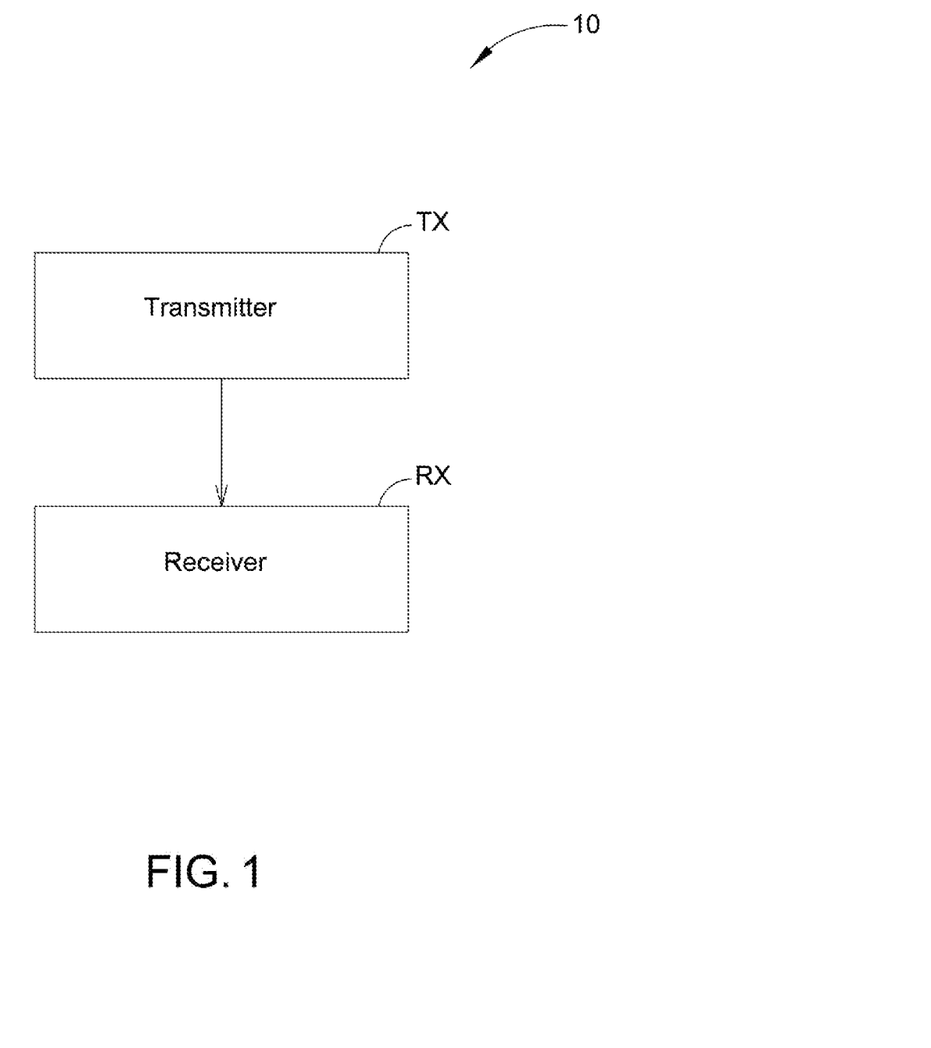
FIG. 1 is a schematic diagram of a communication system according to an embodiment of the present invention.

FIG. 1 shows a schematic diagram of a communication device 10 according to an embodiment of the present invention. For example, the communication system 10 is any communication system capable of transmitting and/or receiving single-carrier signals or multi-carrier signals, and is primarily formed by a transmitter TX and a receiver RX. For example, the multi-carrier signal may be an orthogonal frequency-division multiplexing (OFDM) signal (or referred to as a discrete multi-tone modulation (DMT) signal). In FIG. 1, the transmitter TX and the receiver RX are for illustrating the architecture of the communication system 10. For example, the communication system 10 may be wired communication system such as an asymmetric digital subscriber line (ADSL) system, a power line communication (PLC) system or an Ethernet over coax (EOC) system, or a wireless communication system such as a wireless local area network (WLAN), a Digital Video Broadcasting (DVB) system or a Long Term Evolution-Advanced (LTE-A) system. The DVB system may include a Digital Terrestrial Multimedia Broadcast (DTMB) system, a DVB-Terrestrial (DVT-T) system, a DVB Second Generation Terrestrial/Cable (DVB-T2/C2) system and an Integrated Services Digital Broadcasting (ISDB) system. Further, for example but not limited to, the transmitter TX and the receiver RX may be disposed in a mobile phone, a laptop computer, a tablet computer, an e-book or a portable computer system.

Figure 2:
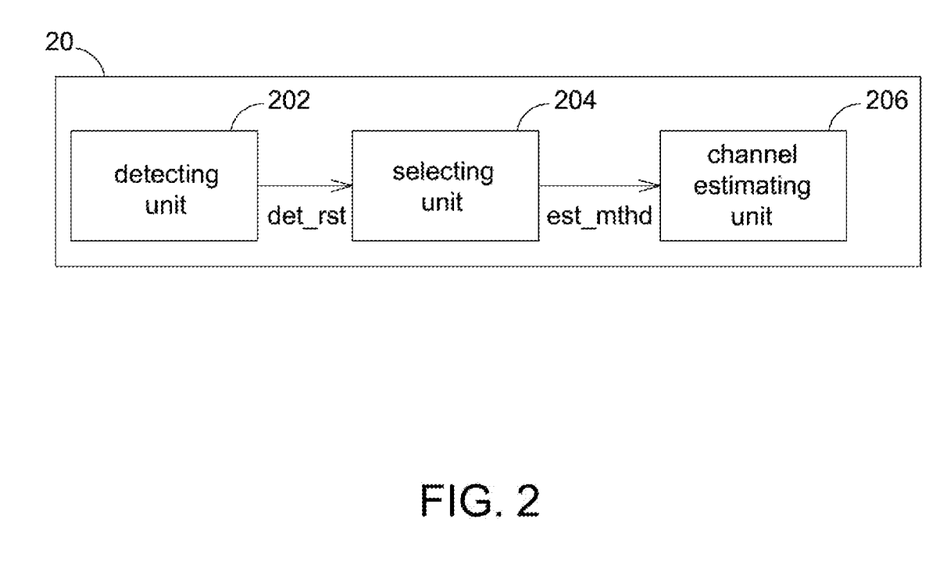
FIG. 2 is a schematic diagram of a communication device according to an embodiment of the present invention.

FIG. 2 shows a schematic diagram of a communication device 20 according to an embodiment of the present invention applied in the receiver RX in FIG. 1 to handle channel estimation. The communication device 20 includes a detecting unit 202, a selecting unit 204 and a channel estimating unit 206. More specifically, the detecting unit 202 performs a mobility detection in a time interval to generate a detection result det_rst. The selecting unit 204, coupled to the detecting unit 202, selects a channel estimation method est_mthd from a plurality of channel estimation methods according to the detection result det_rst. The channel estimating unit 206, coupled to the selecting unit 204, performs a channel estimation on a channel for receiving a signal according to the channel estimation method est_mthd. That is to say, the communication device 20 first performs the mobility detection to determine a variation level of the channel (e.g., the speed and/or range of a variation), generates a corresponding detection result, and then accordingly selects an appropriate channel estimation method. From another perspective, the mobility detection may be regarded as an operation for determining a moving speed of the communication device 20 (and/or another communication device communicating with the communication device 20). In simple, the communication device 20 selects the channel estimation method according to the variation level of the channel.

In one embodiment, the plurality of channel estimation methods may include a least square (LS) method and a least mean square (LMS) method. For example, the selecting unit 204 may select the LS method when the detection result indicates that the channel is a dynamic channel, or may select the LMS method when the detection result indicates that the channel is a static channel. Further, when the variation level of the channel in the time interval is greater than a predetermined value, the channel is indicated as a dynamic channel; when the variation level of the channel in the time interval is smaller than the predetermined value, the channel is indicated as a static channel. In one embodiment, the time interval may include a plurality of signal frames. That is to say, the detecting unit 202 may determine the variation level in the channel according to the multiple signal frames, with such details to be described shortly.

Figure 3:
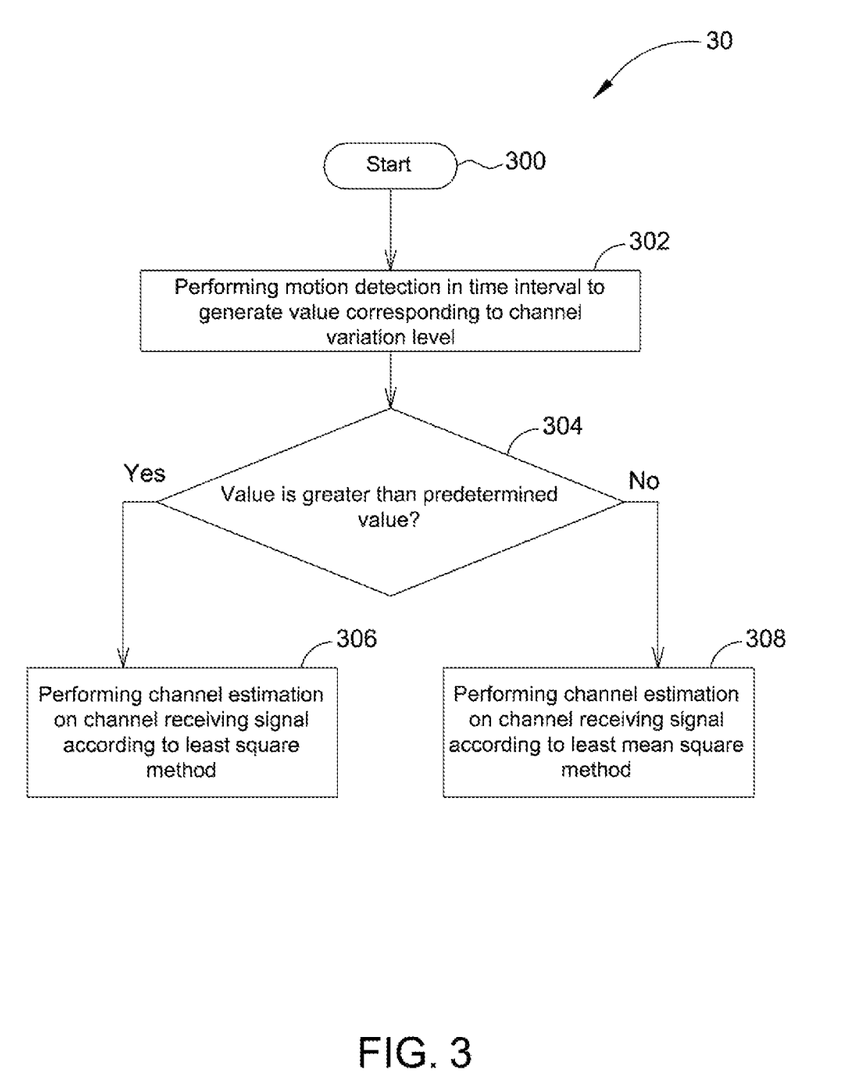
FIG. 3 is a flowchart of a process according to an embodiment of the present invention.

The operation method of the communication device 20 may be concluded into a process 30 applied to the receiver RX. As shown in FIG. 3, the process 30 includes following steps.

In step 300, the process 30 begins.

In step 302, in a time interval, a mobility detection is performed to generate a value corresponding to a channel variation level.

In step 304, it is determined whether the value is greater than a predetermined value. Step 306 is performed if so, or else step 308 is performed.

In step 306, a channel estimation is performed on a channel for receiving a signal according to an LS method.

In step 308, the channel estimation is performed on the channel for receiving the signal according to an LMS method.

The process 30 is an example for explaining the operation method of the communication device 20. Associated details and variations may be referred from the foregoing description, and shall be omitted herein.

In addition, the selecting unit 204 may select a channel estimation method from a plurality of channel estimation methods according to the detection result and/or a signal (to be received). That is to say, the type of the signal is also considered when the channel estimation method is selected. The type of the signal may include a single-carrier signal and a multi-carrier signal. In one embodiment, the channel estimation method is an LS method when the signal includes a single-carrier signal and the detection result indicates that the channel is a dynamic channel, and is an LMS method when the signal includes a single-carrier signal and the detection result indicates that the channel is a static channel. That is to say, for a single-carrier signal, different channel estimation methods are selected according to different channels. In one embodiment, the channel estimation method is an LMS method associated with a first group of parameters when the signal includes a multi-carrier signal and the detection result indicates that the channel is a dynamic channel, and is the LMS method associated with a second group of parameters when the signal includes a multi-carrier signal and the detection result indicates that the channel is a static channel. The memory of the first group of parameters is smaller than the memory of the second group of parameters. That is to say, compared to the second group of parameters, when the first group of parameters are used, an older channel detection result has a smaller weight, whereas a newer channel estimation result has a larger weight.

Figure 4:
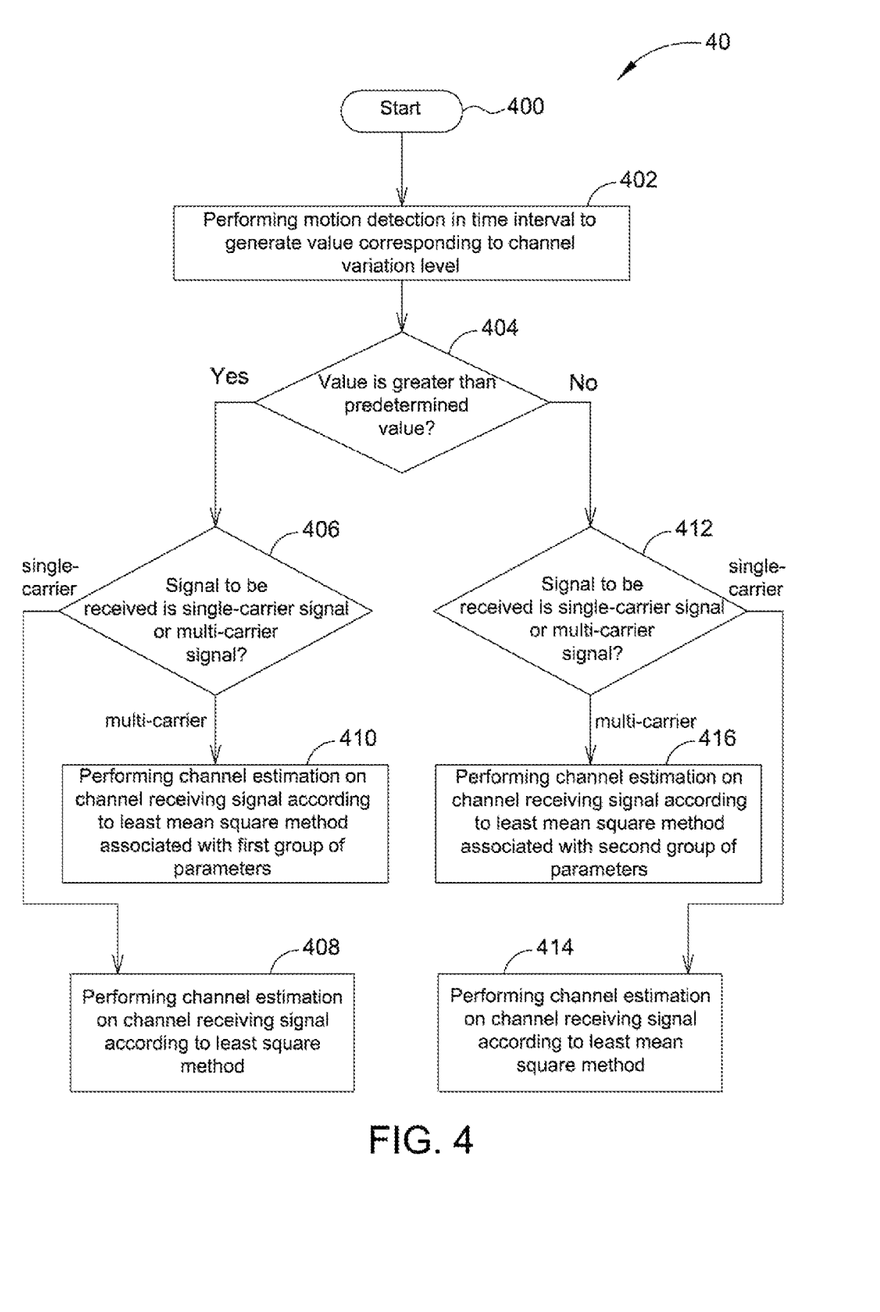
FIG. 4 is a flowchart of a process according to another embodiment of the present invention.

The operation method of the communication device 20 may be concluded into a process 40 applied to the receiver RX. As shown in FIG. 3, the process 40 includes following steps.

In step 400, the process 40 begins.

In step 402, in a timer interval, a mobility detection is performed to generate a value corresponding to a variation level of the channel.

In step 404, it is determined whether the value is greater than a predetermined value. Step 406 is performed if so, or else step 412 is performed.

In step 406, it is determined whether a signal to be received is a single-carrier signal or a multi-carrier signal. Step 408 is performed if the signal to be received is the single-carrier signal, or else step 410 is performed if the signal to be received is the multi-carrier signal.

In step 408, a channel estimation is performed on a channel for receiving a signal according to an LS method.

In step 410, the channel estimation method is performed on the channel for receiving the signal according to an LMS method associated with a first group of parameters.

In step 412, it is determined whether a signal to be received is the single-carrier signal or the multi-carrier signal. Step 414 is performed if the signal to be received is the single-carrier signal, or else step 416 is performed if the signal to be received is the multi-carrier signal.

In step 414, the channel estimation method is performed on the channel for receiving the signal according to the LMS method.

In step 416, the channel estimation method is performed on the channel for receiving the signal according to the LMS method associated with a second group of parameters.

The process 4 is an example for explaining the operation method of the communication device 20. Associated details and variations may be referred from the foregoing description, and shall be omitted herein.

It should be noted that, there are numerous ways to realize the communication device 20 (as well as the detecting unit 202, the selecting unit 204 and the channel estimating unit 206 therein). For example, based on design considerations or system requirements, the detecting unit 202, the selecting unit 204 and the channel estimating unit 206 may be integrated into one or multiple units. Further, for example, the communication device 20 may be realized by hardware, software, firmware (a combination of a hardware device, a computer command and data, with the computer command and the data being read-only software on the hardware device), an electronic device, or a combination of the above.

Figure 5:
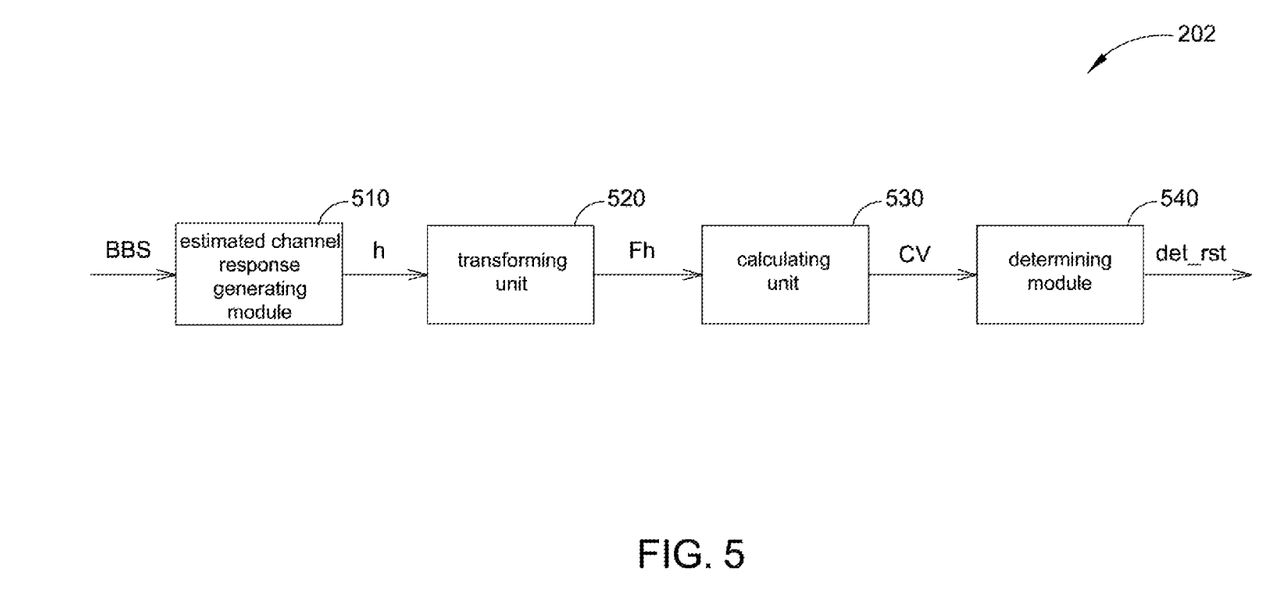
FIG. 5 is a schematic diagram of a detecting unit according to an embodiment of the present invention.

FIG. 5 shows a schematic diagram of the detecting unit 202 in FIG. 1 according to a first embodiment of the present invention. The detecting unit 202 of the embodiment includes: an estimated channel response generating module 510, a transforming unit 520, a calculating unit 530 and a determining module 540. Any two or all of the above circuits may be integrated into one integrated circuit or may be individual circuits. A baseband signal (denoted as BBS in the diagram) received by the detecting unit 202 of the embodiment includes at least one carrier. More specifically, the baseband signal may be an OFDM signal of a wireless communication system, and includes a plurality of sub-carriers that are orthogonal. Again referring to FIG. 5, the estimated channel response generating module 510 receives a baseband signal. To obtain channel characteristics of a wireless channel through which the baseband signal passes, the estimated channel response generating module 510 estimates channel responses of the baseband signal at a plurality of time points according to the baseband signal to generate a plurality of estimated channel responses (denoted as h in the diagram). In one embodiment, the estimated channel response generating module 510 includes a channel estimator adopting pilot-symbol-aided estimation technologies. In one embodiment, the estimated channel response generating module 510 includes a pseudo-noise correlator, which calculates a correlation result between the baseband signal and a pseudo-noise sequence. The frame header of a signal frame of the baseband signal may include a pseudo-noise sequence. The plurality of estimated channel responses generated by the estimated channel response generating module 510 are inputted into the transforming unit 520. The transforming unit 520 performs a transform process to transform time-domain responses to frequency-domain responses according to the plurality of estimated channel responses to generate a plurality of estimated channel frequency responses (denoted as Fh in the diagram) to accordingly observe spectrum characteristics of the wireless channel. The transforming unit 520 may be realized by a fast Fourier transform (FFT) unit based on FFT technologies.

The plurality of estimated channel frequency responses generated by the transforming unit 520 are inputted into the calculating unit 530. The calculating unit 530 performs a calculation according to the plurality of estimated channel frequency responses generated by the transforming unit 520 to generate a plurality of calculated values (denoted as CV in the diagram). In one embodiment, the calculating unit 530 calculates an energy value of each of the plurality of time points of the carrier to generate a plurality of energy values as the above calculated values. The time point may be any time point on the time axis. For example, the energy value may be an energy value of a signal frame of the carrier of the baseband signal. Further, for example, the calculation for the energy value may be calculating a square of an absolute value of the estimated channel frequency response in one embodiment, and may be calculating a square root of an absolute value of the estimated channel frequency response in another embodiment.

The plurality of calculated values generated by the calculating unit 530 are inputted into the determining module 540. The determining module 540 determines whether the channel corresponding to baseband signal is in a time-varying state according to the plurality of calculated values, and generates a detection result (denoted as det_rst in the diagram). More specifically, the determining module 540 may generate a plurality of ratio relationships according to a plurality of time points respectively corresponding to the plurality of calculated values, compare each of the ratio relationships with a threshold to generate a plurality of comparison results, and further perform the calculation according to the comparison results to generate a counter value. The counter value may be utilized to determine whether the channel corresponding to the baseband signal is a dynamic channel.

Figure 6:
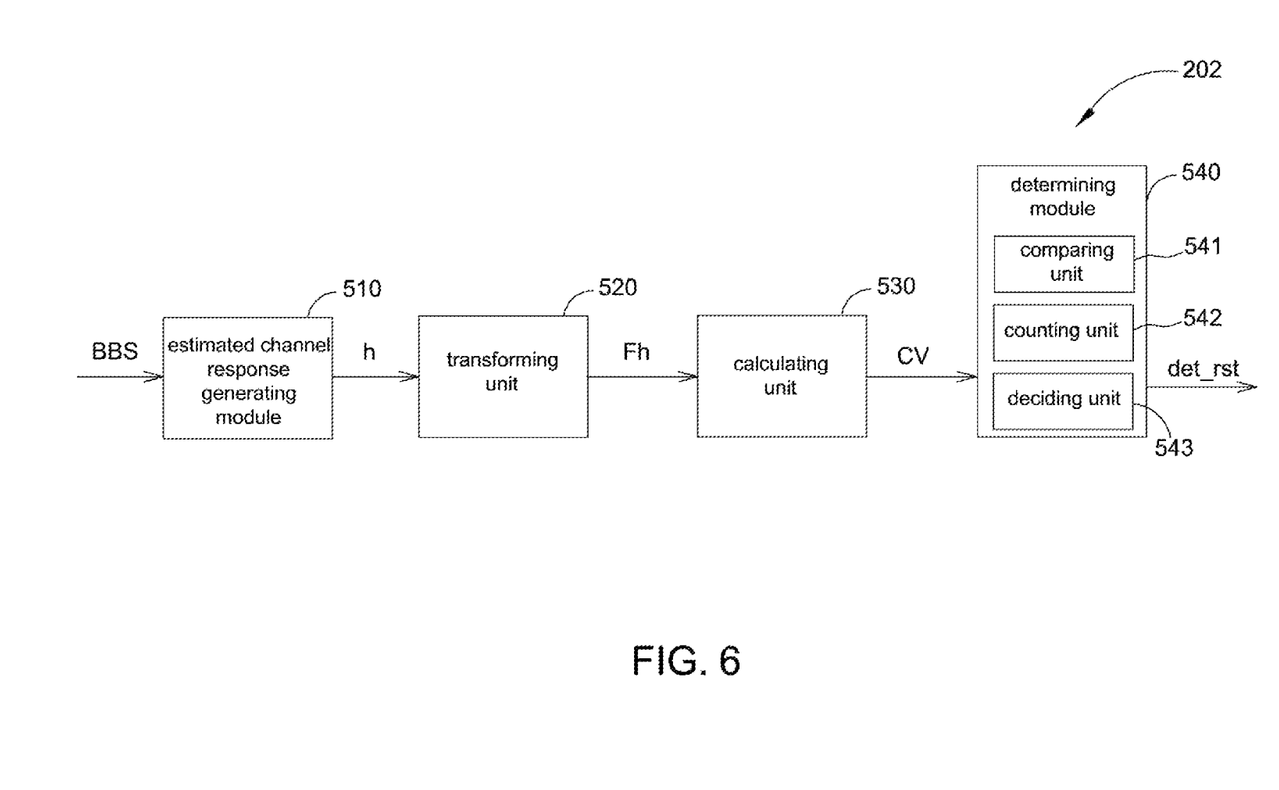
FIG. 6 is a schematic diagram of a detecting unit according to another embodiment of the present invention.

FIG. 6 shows a schematic diagram of the detecting unit 202 in FIG. 1 according to another embodiment of the present invention. As shown, compared to the determining module 540 in FIG. 5, the determining module 540 according to the embodiment of FIG. 6 further includes a comparing unit 541, a counting unit 542 and a deciding unit 543. Any two or all of the above circuits may be integrated into one integrated circuits, or may be individual circuits.

Referring to FIG. 6, the plurality of calculated values generated by the calculating unit 530 are inputted into the determining module 540. The comparing unit 541 calculates a ratio relationship of the plurality of calculated values according to the calculated values, and compares the ratio relationship with a threshold. In one embodiment, the ratio relationship is a ratio value between a first calculated value to a second calculated value. For example, the first calculated value is an energy value of a preceding first time point, the second calculated value is an energy value of a subsequent second time point, and the calculated values may be stored in a storage device (e.g., a register, a buffer or a DRAM, not shown) after being generated by the calculating unit 530 at respective corresponding time points. The comparing unit 541 then compares the ratio value corresponding to the time point with the threshold to generate the comparison result. For example, when the ratio value is a result of dividing the first calculated value by the second calculated value, the threshold is a high threshold (e.g., 2) and the comparison result indicates that the ratio value is greater than the high threshold, the first calculated value is greater than the second calculated value by more than two times. Alternatively, when the threshold is a low threshold (e.g, 0.2) and the comparison result indicates that the ratio value is smaller than the low threshold, the first calculated value is smaller than the second calculated value. Thus, by comparing with a predetermined threshold using the comparing unit 541, the ratio relationship between the first calculated value and the second calculated value can be obtained. As the first calculated value and the second calculated value correspond to different time points, respective variation levels of the first calculated value and the second calculated value corresponding to different time points can be obtained. The counting unit 542 adds a current counter value by one when the comparison result indicates that the ratio value reaches the threshold. After a time interval including multiple time points, the deciding unit 543 may determine whether the wireless channel is dynamic according to the accumulated counter value. If the counter value is greater than a predetermined value, it means that, out of the corresponding different time points, for the calculated value of each time point that is greater than the predetermined value, a substantial variation level exists between this calculated value and the calculated value of the previous time point. The deciding unit 543 may determine whether the wireless channel is dynamic according to the counter value generated based on the accumulated result. It should be noted that, the high threshold and the low threshold may or may not be adopted concurrently. That is, the comparing unit 541 may or may not at the same time compare whether the second calculated value of the subsequent second time point is greater than the first calculated value of the preceding first time point, and whether the second calculated value of the subsequent second time point is smaller than the first calculated value of the preceding first time point. The high threshold and the low threshold may have a relative relationship. For example, the high threshold is 1.2, the low threshold is 0.8, and the respective variation levels are compared to determine whether they are greater by more than 20%. Alternatively, the high threshold and the low threshold may not have a relative relationship. For example, the high threshold is 1.4, the low threshold is 0.8, and the respective variation levels are compared to determine whether they are respectively greater by more than 40% and 20%.

Operations of the detecting unit 202 according to another embodiment of the present invention are given below with reference to FIG. 6. In this embodiment, the detecting unit 202 is at a receiver of a Digital Terrestrial Multimedia Broadcast (DTMB) system or a Digital Multimedia Broadcast-Terrestrial/Handheld (DMB-T/H) system, and is for receiving baseband signals. Each signal includes four layers of structures that are cyclic and synchronous with natural time. The signals are in a unit of frames or signal frames, with one fundamental signal frame being consisting a frame header and a frame body. The frame header includes a pseudo-noise code, and the signal frame is formed by OFDM symbols. The detecting unit 202 is located at a receiver of a DTMB system or a DMB-T/H system. The estimated channel response generating module 510 receives the baseband signal, and estimates a channel response according to the baseband signal at a first time point (corresponding to a first signal frame) to generate a first estimated channel response. The transforming unit 520 transforms the first estimated channel response from a time-domain response to a frequency-domain response to generate a first estimated channel frequency response. The calculating unit 530 calculates a first calculated value according to the first estimated channel frequency response, and stores the first calculated value to a storage device (not shown). The comparing unit 541 generates a ratio relationship between the first calculated value and a previous calculated value, and generates a first comparison result according to the ratio relationship and a threshold. When the first comparison result indicates that the ratio relationship is greater than the threshold, the counter value generated by the counting unit 542 is added by one. At a second time point, the estimated channel response generating module 510 to the calculating unit 530 perform the same procedure to generate a second calculated value, which is stored to a storage device (not shown). The comparing unit 541 calculates another ratio relationship between the second calculated value and the first calculated value according to the second calculated value and the first calculated value stored in a storage device, and generates a second comparison result according to the another ratio relationship and a threshold. When the second comparison result indicates that the another ratio relationship is greater than the threshold, the counter value generated by the counting unit 542 is added by one. In this embodiment, one period may be set as a plurality of signal frames, e.g., 20 or 40 frames are set as one period. The accumulated counter value in the period is compared with a predetermined value. When the accumulated counter result is greater than the predetermined value, the wireless channel is determined as a dynamic channel. After the determination, the counter value is reset to proceed to the dynamic channel discrimination of the next period. It should be noted that, the orders of the steps in this embodiment are an example for illustrative purposes. In possible implementation, embodiments with different orders of the steps are also included the scope of the present invention. Further, for example but not limited to, the time points respectively corresponding to the first calculated value and the second calculated value may be spaced by one OFDM symbol or signal frame.

Figure 7:
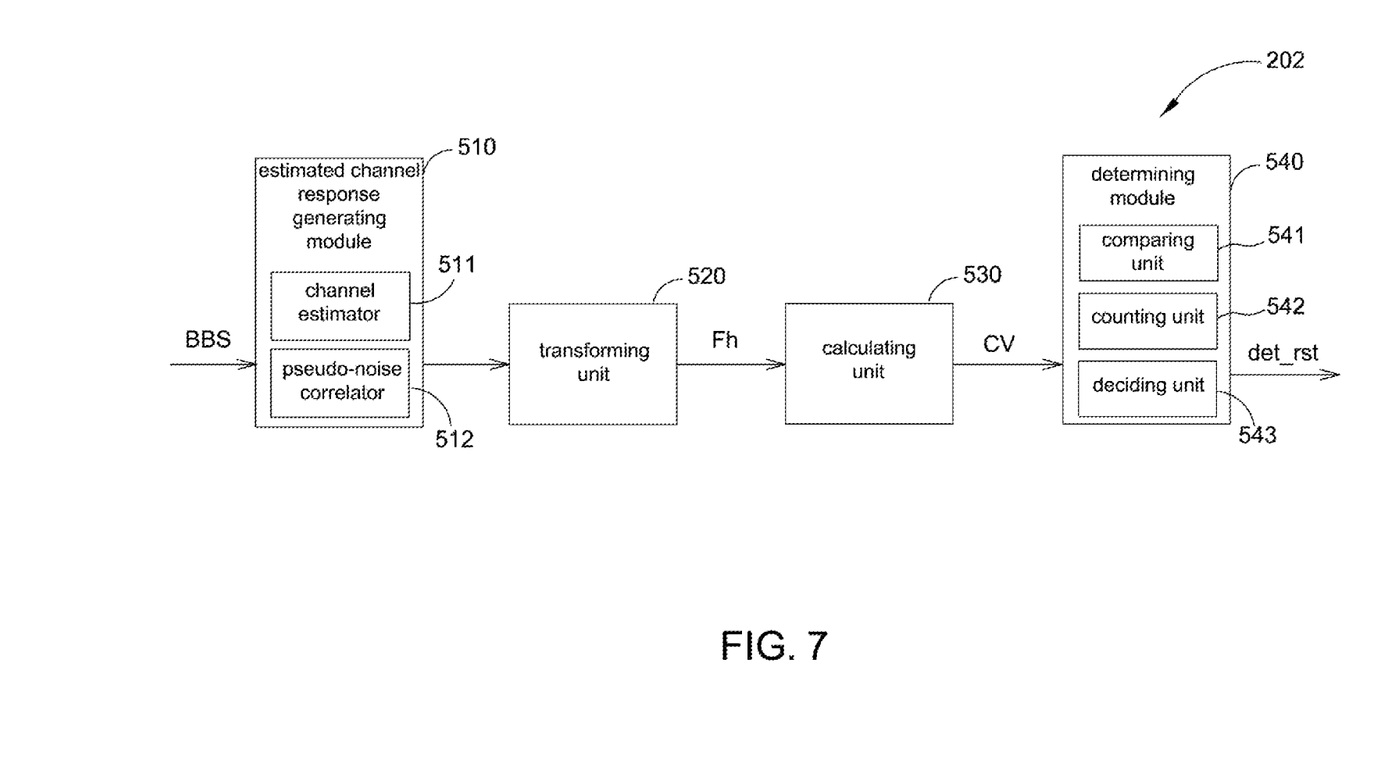
FIG. 7 is a schematic diagram of a detecting unit according to another embodiment of the present invention.

FIG. 7 shows a schematic diagram of the detecting unit 202 in FIG. 1 according to another embodiment of the present invention. As shown, compared to the estimated channel response generating modules 510 in FIG. 5 and FIG. 6, the estimated channel response generating modules 510 according to the embodiment in FIG. 7 further includes a channel estimator 511 and a pseudo-noise correlator 512. Any two or all of the above circuits may be integrated into one integrated circuit or individual circuits.

Again referring to FIG. 7, in this embodiment, the detecting unit 202 is also located at a receiver of a DTMB system and is for receiving a baseband signal. Further, the detecting unit 202 is operable in two modes—an acquisition mode and a tracking mode. In the acquisition mode, the pseudo-noise correlator 512 calculates a correlation result between the baseband signal and a pseudo-noise sequence to generate an estimated channel response. For example, the frame header of a signal frame of the DTMB signal includes a pseudo-noise sequence, and a corresponding channel estimation is accordingly performed. Similarly, the estimated channel response is processed by the transforming unit 521, the calculating unit 530 and the determining module 540 to generate a detection result, according to which it is determined whether the channel is in a time-varying channel state. In the tracking mode, the channel estimator 511 calculates the channel response corresponding to a subcarrier in the baseband signal to generate an estimated channel response. Similarly, the estimated channel response is processed by the transforming unit 520, the calculating unit 530 and the determining module 540 to generate a determination result, according to which it is determined whether the channel is time-varying. Thus, the DTMB system is capable of consistently performing dynamic channel discrimination in the acquisition mode and the tracking mode.

Figure 8:
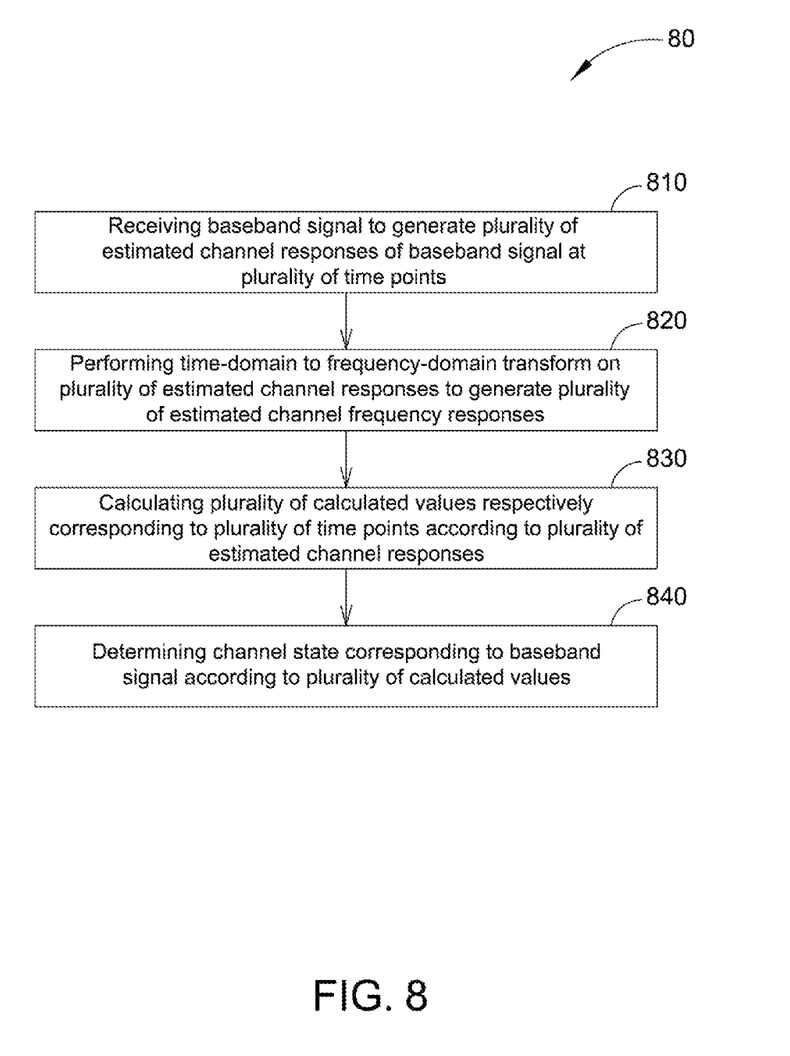
FIG. 8 is a flowchart of a process of mobility detection according to an embodiment of the present invention.

In addition to the above device, the present invention further discloses a dynamic channel discriminating method for performing a mobility detection, as a process 80 shown in FIG. 8. The process 80 may be performed by the detecting unit 202 at a wireless communication receiver, and includes following steps.

In step 810, a baseband signal is received, and a channel response of the baseband signal is estimated at a plurality of time points to generate a plurality of estimated channel responses. This step may be performed by the estimated channel response generating module 510 in FIG. 5 or an equivalent circuit.

In step 820, a time-domain to frequency-domain transform is performed on the plurality of estimated channel responses to generate a plurality of estimated channel frequency responses. This step may be performed by the transforming unit 520 in FIG. 5 or an equivalent circuit. In one embodiment, step 820 further includes performing an FFT process.

In step 830, a plurality of calculated values, respectively corresponding to a plurality of time points, are calculated according to the plurality of estimated channel frequency responses. This step may be performed by the calculating unit 530 in FIG. 5 or an equivalent circuit.

In step 840, a channel state corresponding to the baseband signal is determined according to the calculated values. This step may be performed by the determining module 540 in FIG. 1 or an equivalent circuit. In one embodiment, this step further includes: calculating a plurality of ratio values of the calculated values; comparing the ratio values with a threshold to generate a plurality of comparison results; and generating a counter value according to the comparison results. If the counter value is greater than a predetermined value, the channel is determined as dynamic.

In conclusion, the present invention provides a device and method for handling channel estimation for selecting an appropriate channel estimation method according to a variation level of a channel. The communication device according to the present invention is capable of accurately estimating the channel regardless of whether the channel is a dynamic channel or a static channel.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication device, comprising:
    a detecting unit, performing a mobility detection in a time interval to generate a detection result;
    a selecting unit, coupled to the detecting unit, selecting a channel estimation method from a plurality of channel estimation methods according to the detection result; and
    a channel estimating unit, coupled to the selecting unit, performing a channel estimation on a channel for receiving a signal according to the selected channel estimation method,
    wherein the plurality of channel estimation methods comprise a least square (LS) method and a least mean square (LMS) method, and
    wherein the selecting unit selects the LS method when the detection result indicates that the channel is a dynamic channel, and selects the LMS method when the detection result indicates that the channel is a static channel.

2. The communication device according to claim 1, wherein the channel is indicated as the dynamic channel when a variation level of the channel in the time interval is greater than a predetermined value, and is indicated as the static channel when the variation level of the channel in the time interval is smaller than the predetermined value.

3. The communication device according to claim 1, wherein the time interval comprises a plurality of signal frames.

4. The communication device according to claim 1, wherein the selecting unit selects the channel estimation method from the plurality of channel estimation methods according to the detection result and the signal.

5. The communication device according to claim 4, wherein the signal comprises a single-carrier signal and a multi-carrier signal.

6. The communication device according to claim 5, wherein the selected channel estimation method is an LS method when the signal comprises the single-carrier signal and the detection result indicates that the channel is a dynamic channel, and is an LMS method when the signal comprises the single-carrier signal and the detection result indicates that the channel is a static channel.

7. The communication device according to claim 5, wherein the selected channel estimation method is an LMS method having a first group of parameters when the signal comprises the multi-carrier signal and the detection result indicates that the channel is a dynamic channel, and is the LMS having a second group of parameters when the signal comprises the multi-carrier signal and the detection result indicates that the channel is a static channel.

8. The communication device according to claim 7, wherein a memory of the first group of parameters is smaller than the memory of the second group of parameters.

9. A method for handling channel estimation, comprising:
    performing a mobility detection in a time interval to generate a detection result by a detecting unit;
    selecting a channel estimation method from a plurality of channel estimation methods according to the detection result by a selecting unit; and
    performing a channel estimation on a channel for receiving a signal according to the selected channel estimation method by a channel estimating unit,
    wherein the plurality of channel estimation method comprise a least square (LS) method and a least mean square (LMS) method, and
    wherein the step of selecting the channel estimation method from the plurality of channel estimation methods by the selecting unit comprises:
    selecting the LS method when the detection result indicates that the channel is a dynamic channel, and selecting the LMS method when the detection result indicates that the channel is a static channel.

10. The method according to claim 9, wherein the channel is indicated as the dynamic channel when a variation level of the channel in the time interval is greater than a predetermined value, and is indicated as the static channel when the variation level of the channel in the time interval is smaller than the predetermined value.

11. The method according to claim 9, wherein the time interval comprises a plurality of signal frames.

12. The method according to claim 9, wherein the selecting unit selects the channel estimation method from the plurality of channel estimation methods further according to the signal.

13. The method according to claim 12, wherein the signal comprises a single-carrier signal and a multi-carrier signal.

14. The method according to claim 13, wherein the selected channel estimation method is an LS method when the signal comprises the single-carrier signal and the detection result indicates that the channel is a dynamic channel, and is an LMS method when the signal comprises the single-carrier signal and the detection result indicates that the channel is a static channel.

15. The method according to claim 13, wherein the selected channel estimation method is an LS method having a first group of parameters when the signal comprises the multi-carrier signal and the detection result indicates that the channel is a dynamic channel, and is an LMS having a second group of parameters when the signal comprises the multi-carrier signal and the detection result indicates that the channel is a static channel.

16. The method according to claim 15, wherein a memory of the first group of parameters is smaller than the memory of the second group of parameters.

* * * * *